(12) United States Patent
Shimizu et al.

(10) Patent No.: US 8,506,454 B2
(45) Date of Patent: Aug. 13, 2013

(54) FLUID PRESSURE CONTROL DEVICE FOR AUTOMATIC TRANSMISSION

(75) Inventors: Tetsuya Shimizu, Anjo (JP); Tomoya Jinno, Nishio (JP); Masamichi Yamaguchi, Anjo (JP); Kenichi Tsuchida, Nishio (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/418,906

(22) Filed: Mar. 13, 2012

(65) Prior Publication Data

US 2012/0234645 A1    Sep. 20, 2012

(30) Foreign Application Priority Data

Mar. 18, 2011  (JP) .................................. 2011-060303

(51) Int. Cl.
    *F16H 61/26*   (2006.01)
(52) U.S. Cl.
    USPC ........................................................ 477/156
(58) Field of Classification Search
    None
    See application file for complete search history.

(56) References Cited

U.S. PATENT DOCUMENTS

| | | | | |
|---|---|---|---|---|
| 7,163,481 B2 * | 1/2007 | Takagi et al. | ................. | 475/101 |
| 7,951,043 B2 * | 5/2011 | Reisch et al. | ................. | 477/156 |
| 8,303,468 B2 * | 11/2012 | Shimizu et al. | ................. | 477/130 |
| 8,360,220 B2 * | 1/2013 | Shimizu et al. | ............... | 192/85.63 |
| 8,413,783 B2 * | 4/2013 | Shimizu et al. | ............... | 192/85.63 |
| 2010/0193313 A1 | 8/2010 | Shimizu et al. | | |
| 2011/0237394 A1 * | 9/2011 | Hirai et al. | ................... | 477/167 |
| 2011/0237395 A1 * | 9/2011 | Shimizu et al. | ............... | 477/168 |
| 2013/0012354 A1 * | 1/2013 | Shimizu et al. | .................. | 477/83 |

FOREIGN PATENT DOCUMENTS

| | | |
|---|---|---|
| JP | A-2000-46165 | 2/2000 |
| JP | A-2001-280458 | 10/2001 |
| JP | A-2009-287682 | 12/2009 |
| JP | A-2010-175039 | 8/2010 |

OTHER PUBLICATIONS

May 1, 2012 International Search Report issued in International Patent Application No. PCT/JP2012/053156 (with translation).

* cited by examiner

*Primary Examiner* — Dirk Wright

(74) *Attorney, Agent, or Firm* — Oliff & Berridge, PLC

(57) ABSTRACT

A fluid pressure control device including a first pump actuated by power from a motor; a pressure regulator that regulates a discharge pressure from the first pump; a second pump actuated by electric power; a switcher opening a first path extending from the pressure regulator to a fluid pressure chamber of a friction engagement element, and blocking a second path extending from the second pump to the fluid pressure chamber of the friction engagement element, when the signal pressure is equal to or more than a set pressure, and the switcher blocking the first and opening the second paths when the signal pressure is less than the set pressure; and a control that controls the second pump and the fluid supply unit to supply the fluid regulated by the pressure regulator to a destination different from the fluid pressure chamber of the friction engagement element when the motor is stopped.

4 Claims, 5 Drawing Sheets

F I G . 1
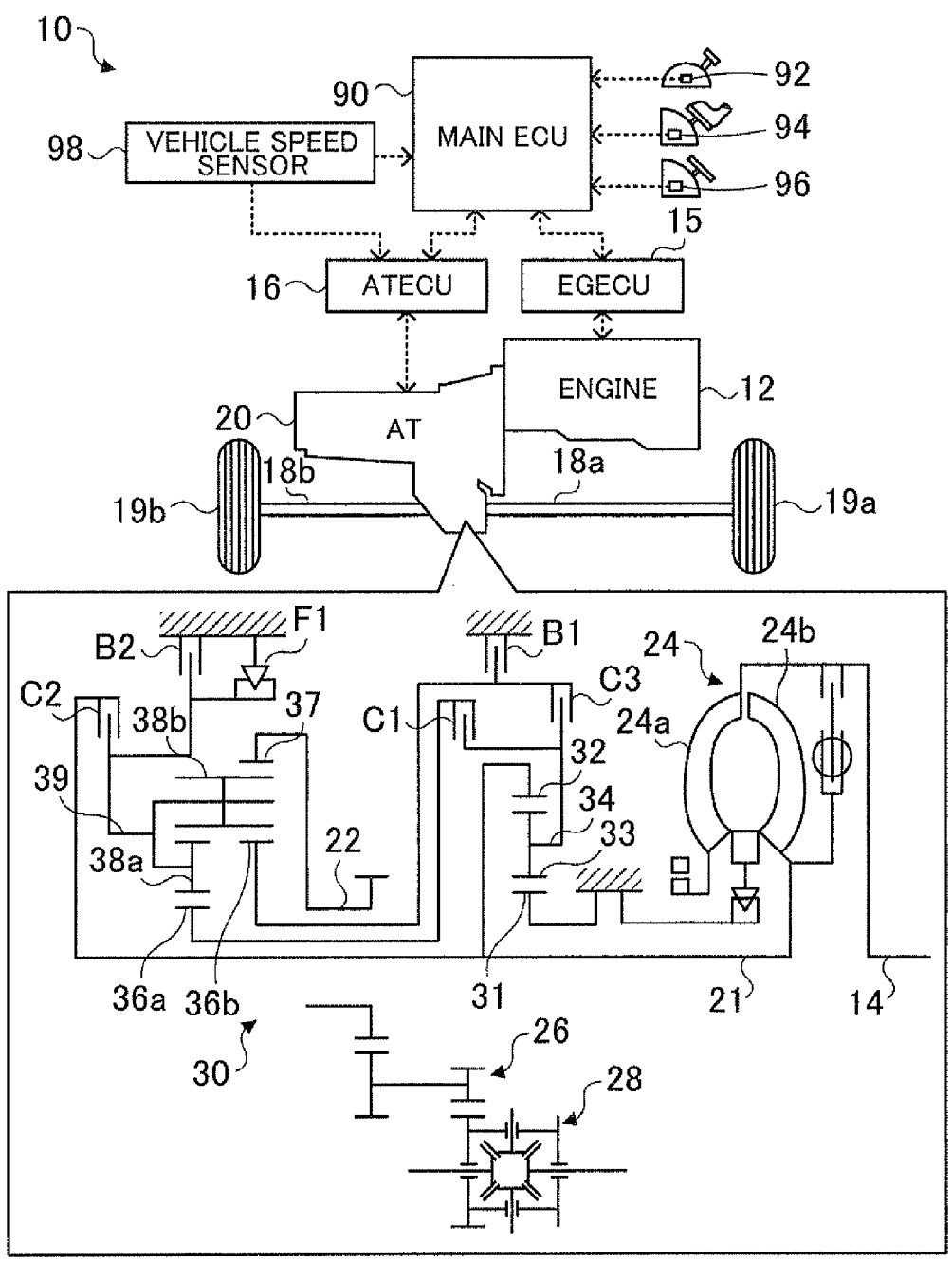

|  | C-1 | C-2 | C-3 | B-1 | B-2 | F-1 | SL1 | SL2 | SL3 | SL5 | S1 | S2 |
|---|---|---|---|---|---|---|---|---|---|---|---|---|
| P |  |  |  |  |  |  |  |  |  |  |  |  |
| REV |  |  | O |  | O |  |  |  |  |  |  |  |
| N |  |  |  |  |  |  |  |  |  |  |  |  |
| D 1st | O |  |  |  | (O) | O | O |  | (O) |  | (O) |  |
| D 2nd | O |  |  | O |  |  | O |  |  | O |  |  |
| D 3rd | O |  | O |  |  |  | O |  | O |  |  |  |
| D 4th | O | O |  |  |  |  | O | O |  |  |  |  |
| D 5th |  | O | O |  |  |  |  | O | O |  |  |  |
| D 6th |  | O |  | O |  |  |  | O |  | O |  |  |

(O): ENGAGED WITH ENGINE BRAKE IN OPERATION

FLUID PRESSURE CONTROL DEVICE FOR AUTOMATIC TRANSMISSION

INCORPORATION BY REFERENCE

The disclosure of Japanese Patent Application No. 2011-060303 filed on Mar. 18, 2011 including the specification, drawings and abstract is incorporated herein by reference in its entirety.

BACKGROUND OF THE INVENTION

The present invention relates to a fluid pressure control device for an automatic transmission that is mounted on a vehicle including a motor capable of intermittent operation and that transfers power from the motor to an axle side with the speed of the power changed via a friction engagement element actuated by a fluid pressure.

DESCRIPTION OF THE RELATED ART

Hitherto, there has been proposed a fluid pressure control device for an automatic transmission that is mounted on an automobile with an idle stop function and that includes a mechanical pump actuated by power of an engine, a linear solenoid valve SLC1 that regulates a discharge pressure from the mechanical pump, an electromagnetic pump, and a switching valve that receives a modulator pressure as a signal pressure for operation, that allows communication between an output port of the linear solenoid valve SLC1 and a clutch oil chamber of a clutch C1 for starting and blocks communication between a discharge port of the electromagnetic pump and the clutch oil chamber of the clutch C1 when the signal pressure is equal to or more than a set pressure, and that blocks communication between the output port of the linear solenoid valve SLC1 and the clutch oil chamber of the clutch C1 and allows communication between the discharge port of the electromagnetic pump and the clutch oil chamber of the clutch C1 when the signal pressure is less than the set pressure (see Japanese Patent Application Publication No. 2010-175039, for example). In the device, when idling of the engine is stopped, the electromagnetic pump is driven in place of the mechanical pump, operation of which has been stopped along with stop of operation of the engine, to apply a hydraulic pressure (stroke end pressure) to the clutch oil chamber of the clutch C1. This allows the clutch C1 to be engaged immediately when the hydraulic pressure from the mechanical pump is raised next time the engine is started, which allows the vehicle to start moving smoothly.

SUMMARY OF THE INVENTION

In the device discussed above, the switching valve is configured such that a spool is pressed toward one end side by the urging force of a spring. When a hydraulic pressure exceeding the urging force of the spring (hydraulic pressure equal to or more than the set pressure) is input as the signal pressure, the spool is moved toward the other end side to allow communication between the clutch oil chamber of the clutch C1 and the output port of the linear solenoid valve SLC1. When the mechanical pump is stopped and the signal pressure becomes lower than the hydraulic pressure exceeding the urging force of the spring, the spool is returned toward one end side to allow communication between the clutch oil chamber of the clutch C1 and the discharge port of the electromagnetic pump. Therefore, supply of a hydraulic pressure from the electromagnetic pump to the clutch oil chamber of the clutch C1 is not performed since the engine is stopped until the modulator pressure is reduced to be less than the set pressure, during which the hydraulic pressure applied to the clutch oil chamber of the clutch C1 may be reduced to be significantly less than the stroke end pressure to move a piston of the clutch C1 away from its stroke end. Thus, if the engine is started during a relatively short period after the engine is stopped, the clutch C1 may not be engaged in time, which may cause high-rpm idling of the engine or slipping of the clutch.

A main object of a fluid pressure control device for an automatic transmission according to the present invention is to allow a friction engagement element for starting to be engaged quickly even if a motor is stopped and started during a short period while a vehicle is stationary.

In order to achieve the foregoing main object, the fluid pressure control device for an automatic transmission according to the present invention adopts the following means.

According to an aspect of the present invention,
a fluid pressure control device for an automatic transmission that is mounted on a vehicle including a motor capable of intermittent operation and that transfers power from the motor to an axle side with a speed of the power changed via a friction engagement element actuated by a fluid pressure, includes:
a first pump actuated by the power from the motor;
a pressure regulator that regulates a discharge pressure from the first pump;
a second pump actuated by supply of electric power;
a switcher actuated by a signal pressure generated on the basis of a fluid pressure regulated by the pressure regulator, the switcher opening a first path, which extends from the pressure regulator to a fluid pressure chamber of a friction engagement element for starting, and blocking a second path, which extends from the second pump to the fluid pressure chamber of the friction engagement element for starting, when the signal pressure is equal to or more than a set pressure, and the switcher blocking the first path and opening the second path when the signal pressure is less than the set pressure;
a fluid supply unit that supplies the fluid pressure regulated by the pressure regulator to a destination different from the fluid pressure chamber of the friction engagement element for starting; and
a control section that controls the second pump so as to be actuated and controls the fluid supply unit so as to supply the fluid pressure regulated by the pressure regulator to the destination when the motor which has been in operation is stopped.

The fluid pressure control device for an automatic transmission according to the aspect of the present invention includes: a first pump actuated by the power from the motor; a pressure regulator that regulates a discharge pressure from the first pump; a second pump actuated by supply of electric power; a switcher actuated by a signal pressure generated on the basis of a fluid pressure regulated by the pressure regulator, the switcher opening a first path, which extends from the pressure regulator to a fluid pressure chamber of a friction engagement element for starting, and blocking a second path, which extends from the second pump to the fluid pressure chamber of the friction engagement element for starting, when the signal pressure is equal to or more than a set pressure, and the switcher blocking the first path and opening the second path when the signal pressure is less than the set pressure; and a fluid supply unit that supplies the fluid pressure regulated by the pressure regulator to a destination different from the fluid pressure chamber of the friction engagement element for starting. When the motor which has been in operation is stopped, the second pump is controlled so as to be actuated, and the fluid supply unit is controlled so as to supply the fluid pressure regulated by the pressure regulator to the destination. Consequently, the fluid pressure regulated by the pressure regulator is forcibly reduced so that the path opened by the switcher is quickly switched from the first path to the second path, which allows the fluid pressure from the second pump to be supplied early to the friction engagement element for starting. As a result, the fluid pressure chamber of the friction engagement element for starting can be kept standing by at a fluid pressure suitable for next engagement immediately after the motor is stopped. Thus, the friction engagement element for starting can be engaged quickly even if the motor is stopped and started during a short period while the vehicle is stationary.

In the fluid pressure control device for an automatic transmission according to the above-described aspect, which is capable of switching an engagement state of a plurality of friction engagement elements to change between shift speeds, the fluid supply unit may be a supply unit that supplies the fluid pressure to a fluid pressure chamber of a friction engagement element, of the plurality of friction engagement elements, that is different from the friction engagement element for starting as the destination. In the fluid pressure control device for an automatic transmission according to this form, the fluid supply unit may be a supply unit that supplies the fluid pressure to a fluid pressure chamber of a friction engagement element, of the plurality of friction engagement elements as the destination, that allows, together with an oil passage up to the fluid pressure chamber, a large volume of a fluid to flow.

In the fluid pressure control device for an automatic transmission described above, in addition, the second pump may be an electromagnetic pump that discharges a fluid pressure by reciprocating a piston by turning on and off an electromagnetic force.

BRIEF DESCRIPTION OF THE DRAWINGS

FIG. 1 is a diagram showing a schematic configuration of an automobile 10;

DETAILED DESCRIPTION OF THE EMBODIMENTS

An embodiment of the present invention will be described below.

Figures 2, 3:
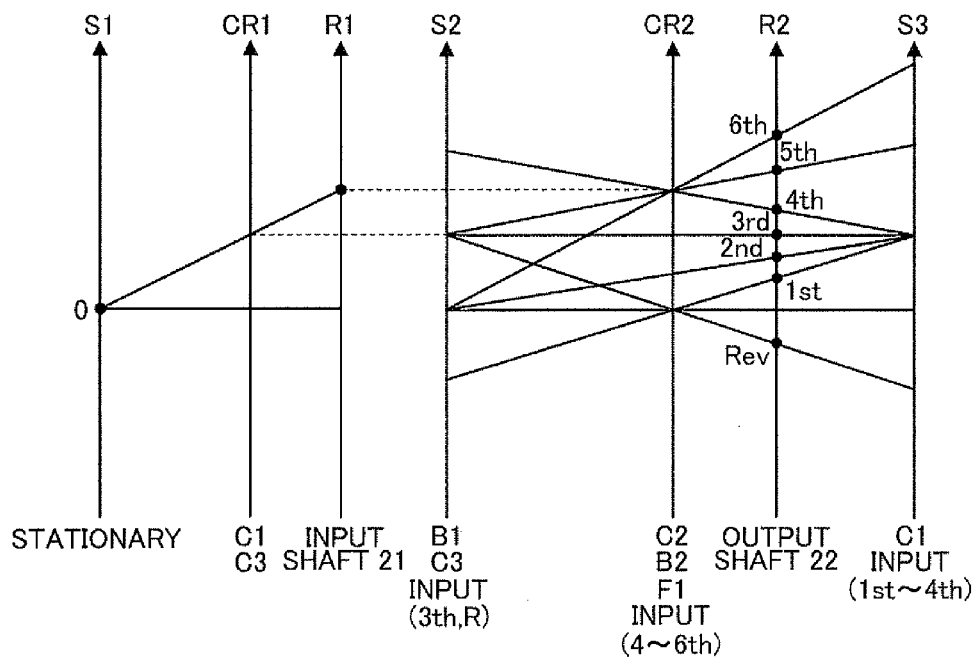
FIG. 2 is an operation table of a speed change mechanism 30.
FIG. 3 is a collinear diagram showing the relationship between the respective rotational speeds of various rotary elements of the speed change mechanism 30.

FIG. 1 is a diagram showing a schematic configuration of an automobile 10 on which an automatic transmission 20 is mounted. FIG. 2 is an explanatory drawing showing an operation table of a speed change mechanism 30.

As shown in FIG. 1, the automobile 10 includes: an engine 12 which is an internal combustion engine that outputs power generated by explosive combustion of a hydrocarbon fuel such as gasoline and light oil; an engine electronic control unit (engine ECU) 15 that controls operation of the engine 12; the automatic transmission 20 connected to a crankshaft 14 of the engine 12 and to axles 18a and 18b for left and right wheels 19a and 19b, respectively, to transfer power from the engine 12 to the axles 18a and 18b with the speed of the power changed; an automatic transmission electronic control unit (AT ECU) 16 that controls the automatic transmission 20; and a main electronic control unit (main ECU) 90 that controls the entire vehicle. The main ECU 90 receives a shift position SP from a shift position sensor 92, an accelerator operation amount Acc from an accelerator pedal position sensor 94, a brake switch signal BSW from a brake switch 96, a vehicle speed V from a vehicle speed sensor 98, and so forth via an input port. The main ECU 90 is connected to the engine ECU 15 and the AT ECU 16 via a communication port to exchange various control signals and data with the engine ECU 15 and the AT ECU 16. A hydraulic circuit 40 and the AT ECU 16 correspond to the fluid pressure control device for an automatic transmission according to the present invention.

As shown in FIG. 1, the automatic transmission 20 includes: a torque converter 24 with a lock-up clutch including a pump impeller 24a on the input side connected to the crankshaft 14 of the engine 12 and a turbine runner 24b on the output side; the stepped speed change mechanism 30 which includes an input shaft 21 connected to the turbine runner 24b of the torque converter 24 and an output shaft 22 connected to the axles 18a and 18b via a gear mechanism 26 and a differential gear 28 and which outputs to the output shaft 22 power input to the input shaft 21 with the speed of the power changed; and the hydraulic circuit 40 (see FIG. 4) which serves as an actuator that drives the speed change mechanism 30. In the embodiment, the torque converter 24 is interposed between the crankshaft 14 of the engine 12 and the speed change mechanism 30. However, the present invention is not limited thereto, and various starting devices may be adopted.

The speed change mechanism 30 is formed as a 6-speed stepped speed change mechanism, and includes a single-pinion type planetary gear mechanism, a Ravigneaux type planetary gear mechanism, three clutches C1, C2, and C3, two brakes B1 and B2, and a one-way clutch F1. The single-pinion type planetary gear mechanism includes a sun gear 31 which is an externally toothed gear, a ring gear 32 which is an internally toothed gear disposed concentrically with the sun gear 31, a plurality of pinion gears 33 meshed with the sun gear 31 and meshed with the ring gear 32, and a carrier 34 that rotatably and revolvably holds the plurality of pinion gears 33. The sun gear 31 is fixed to a case. The ring gear 32 is connected to the input shaft 21. The Ravigneaux type planetary gear mechanism includes two sun gears 36a and 36b which are each an externally toothed gear, a ring gear 37 which is an internally toothed gear, a plurality of short pinion gears 38a meshed with the sun gear 36a, a plurality of long pinion gears 38b meshed with the sun gear 36b and the plurality of short pinion gears 38a and meshed with the ring gear 37, and a carrier 39 that couples the plurality of short pinion gears 38a and the plurality of long pinion gears 38b to each other and that rotatably and revolvably holds the gears 38a and the gears 38b. The sun gear 36a is connected to the carrier 34 of the single-pinion type planetary gear mechanism via the clutch C1. The sun gear 36b is connected to the carrier 34 via the clutch C3, and connected to the case via the brake B1. The ring gear 37 is connected to the output shaft 22. The carrier 39 is connected to the input shaft 21 via the clutch C2. The carrier 39 is also connected to the ease via the one-way clutch F1, and connected to the case via the B2 which is provided in parallel with the one-way clutch F1.

As shown in FIG. 2, the speed change mechanism 30 can switchably establish first to sixth forward speeds, a reverse speed, and a neutral state by turning on and off (engaging and disengaging) the clutches C1 to C3 and turning on and off the brakes B1 and B2 in combination. The reverse speed can be established by turning on the clutch C3 and the brake B2 and turning off the clutches C1 and C2 and the brake B1. The first forward speed can be established by turning on the clutch C1 and turning off the clutches C2 and C3 and the brakes B1 and B2. When the engine brake is in operation, the first forward speed can be established with the brake B2 turned on. The second forward speed can be established by turning on the clutch C1 and the brake B1 and turning off the clutches C2 and C3 and the brake B2. The third forward speed can be established by turning on the clutches C1 and C3 and turning off the clutch C2 and the brakes B1 and B2. The fourth forward speed can be established by turning on the clutches C1 and C2 and turning off the clutch C3 and the brakes B1 and B2. The fifth forward speed can be established by turning on the clutches C2 and C3 and turning off the clutch C1 and the brakes B1 and B2. The sixth forward speed can be established by turning on the clutch C2 and the brake B1 and turning off the clutches C1 and C3 and the brake B2. The neutral state can be established by turning off all the clutches C1 to C3 and the brakes B1 and B2. FIG. 3 illustrates the relationship between the respective rotational speeds of the various rotary elements of the speed change mechanism 30 for the various shift speeds. In the drawing, the S1 axis represents the rotational speed of the sun gear 33. The CR1 axis represents the rotational speed of the carrier 34. The R1 axis represents the rotational speed of the ring gear 32. The S2 axis represents the rotational speed of the sun gear 36b. The S3 axis represents the rotational speed of the sun gear 36a. The CR2 axis represents the rotational speed of the carrier 39. The R2 axis represents the rotational speed of the ring gear 37.

Figure 4:
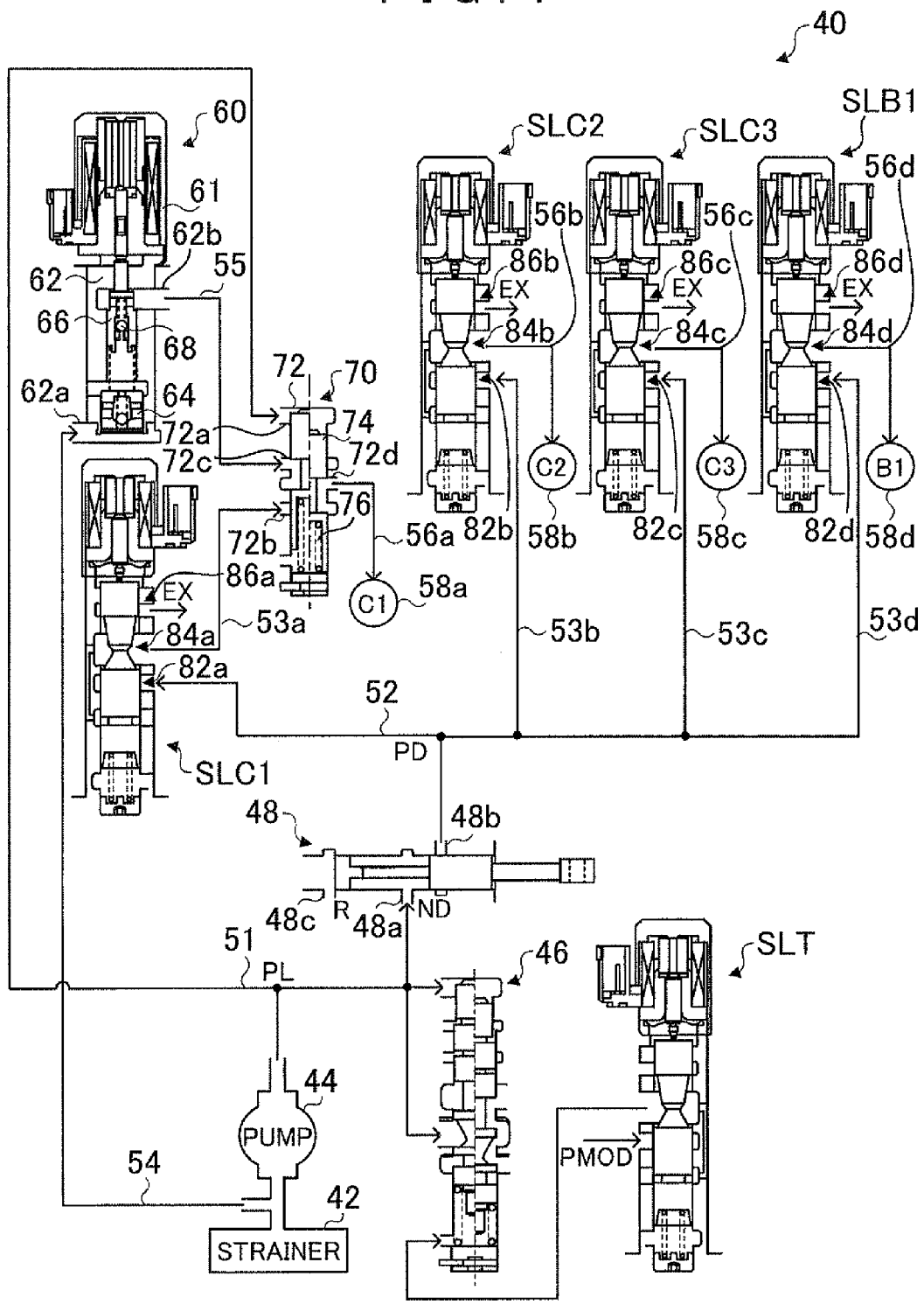
FIG. 4 is a diagram showing a schematic configuration of a hydraulic circuit 40.

The clutches C1 to C3 and the brakes B1 and B2 in the speed change mechanism 30 are turned on and off (engaged and disengaged) by the hydraulic circuit 40. As shown in FIG. 4, the hydraulic circuit 40 is formed by components including: a mechanical oil pump 44 that is actuated by power from the engine 12 to suck working oil via a strainer 42 and pump the working oil into a line pressure oil passage 51; a regulator valve 46 that regulates the pressure of the working oil pumped from the mechanical oil pump 44 to generate a line pressure PL; a linear solenoid valve SLT that drives the regulator valve 46 by regulating a modulator pressure PMOD generated from the line pressure PL via a modulator valve (not shown) to output the modulator pressure PMOD as a signal pressure; a manual valve 48 formed with an input port 48a connected to the line pressure oil passage 51, a D (drive)-position output port 48b connected to a drive pressure oil passage 52, and a R (reverse)-position output port 48c, and the like, the manual valve 48 allowing communication between the input port 48a and the D-position output port 48b and blocking communication between the input port 48a and the R-position output port 48c when a shift operation is made to the D position, blocking communication between the input port 48a and the D-position output port 48b and allowing communication between the input port 48a and the R-position output port 48c when a shift operation is made to the R position, and blocking communication between the input port 48a and the D-position output port 48b and the R-position output port 48c when a shift operation is made to the N position; linear solenoid valves SLC1, SLC2, SLC3, and SLB1 respectively formed with input ports 82a to 82d connected to the common drive pressure oil passage 52, output ports 84a to 84d connected to corresponding output port oil passages 53a, and 56b to 56d, and drain ports 86a to 86d, the linear solenoid valves SLC1, SLC2, SLC3, and SLB1 receiving and regulating a drive pressure PD output from the D-position output port 48b from the corresponding input ports 82a to 82d to output the regulated pressure from the corresponding output ports 84a to 84d with a part of the working oil drained from the drain ports 86a to 86d; an electromagnetic pump 60 formed with a suction port 62a connected to the strainer 42 via a suction port oil passage 54 and a discharge port 62b connected to a discharge port oil passage 55, the electromagnetic pump 60 sucking working oil from the suction port 62a via a built-in suction check valve 64 and discharging the sucked working oil from the discharge port 62b via a built-in discharge check valve 68 by intermittently turning on and off a solenoid 61 to cause reciprocal motion of a piston 66 through an electromagnetic force; and a C1 relay valve 70 that selectively switches between a mode in which an SLC1 pressure which is a pressure output from the linear solenoid valve SLC1 is supplied to an oil chamber 58a of the clutch C1 and a mode in which the discharge pressure from the electromagnetic pump 60 is supplied to the oil chamber 58a of the clutch C1. Here, the hydraulic pressure output from the respective output ports 84a to 84d of the linear solenoid valves SLC1, SLC2, SLC3, and SLB1 are supplied to the oil chambers 58a to 58d of the clutches C1 to C3 and the brake B1 via corresponding clutch oil passages 56a to 56c and a brake oil passage 56d. In the embodiment, the linear solenoid valves SLC1, SLC2, SLC3, and SLB1 are each formed as a normally close linear solenoid valve that is closed when a solenoid current is turned off. The hydraulic pressure supply system for the brake B2 is not shown in FIG. 4, but may be formed by a solenoid valve or a relay valve known in the art.

As shown in FIG. 4, the C1 relay valve 70 includes a sleeve 72 formed with various ports, a spool 74 that slides in the sleeve 72 to allow and block communication between the various ports, and a spring 76 that presses an end surface of the spool 74. The various ports formed in the sleeve 72 include: a signal pressure port 72a connected to the line pressure oil passage 51 to receive the line pressure PL as a signal pressure that presses an end surface of the spool 74 in the opposite direction to the urging force of the spring 76; an input port 72b connected to the output port oil passage 53a to receive the SLC1 pressure; an input port 72c connected to the discharge port oil passage 55 to receive the discharge pressure from the electromagnetic pump 60; and an output port 72d connected to the clutch oil passage 56a connected to the oil chamber 58a of the clutch C1.

In the C1 relay valve 70, when the line pressure PL which is equal to or more than the pressure exceeding the urging force of the spring 76 (set pressure) is applied to the signal pressure port 72a, the spool 74 is moved by the line pressure PL in the direction of contracting the spring 76 (position shown on the right half in FIG. 4). In this state, communication between the input port 72b and the output port 72d is allowed, and communication between the input port 72c and the output port 72d is blocked. Therefore, the output port 84a of the linear solenoid valve SLC1 is communicated with the oil chamber 58a of the clutch C1 sequentially via the output port oil passage 53a, the input port 72b, the output port 72d, and the clutch oil passage 56a, and communication between the discharge port 62b of the electromagnetic pump 60 and the oil chamber 58a of the clutch C1 is blocked. When the line pressure PL which is equal to or more than the pressure exceeding the urging force of the spring 76 (set pressure) is not applied to the signal pressure port 72a, on the other hand, the spool 74 is moved by the urging force of the spring 76 in the direction of expanding the spring 76 (position shown on the left half in FIG. 4). In this state, communication between the input port 72b and the output port 72d is blocked, and communication between the input port 72c and the output port 72d is allowed. Therefore, communication between the output port 84a of the linear solenoid valve SLC1 and the oil chamber 58a of the clutch C1 is blocked, and the discharge port 62b of the electromagnetic pump 60 is communicated with the oil chamber 58a of the clutch C1 sequentially via the discharge port oil passage 55, the input port 72c, the output port 72d, and the clutch oil passage 56a.

In the automobile 10 according to the embodiment configured as described above, the engine 12 is automatically stopped when automatic stop conditions set in advance, such as the vehicle speed V having a value of zero, the accelerator turned off, and the brake switch signal BSW turned on, are all satisfied while the automobile 10 is traveling with a shift lever in the D position. After the engine 12 is automatically stopped, the engine 12 which has been automatically stopped is automatically started when automatic start conditions set in advance, such as the brake switch signal BSW turned off, are satisfied. Such automatic start control and automatic stop control for the engine 12 is performed by the main ECU 90, which determines whether the automatic start conditions are satisfied and whether the automatic stop conditions are satisfied on the basis of various received detected signals to transmit a control command according to the determination results to the engine ECU 15 and the AT ECU 16.

Figure 5:
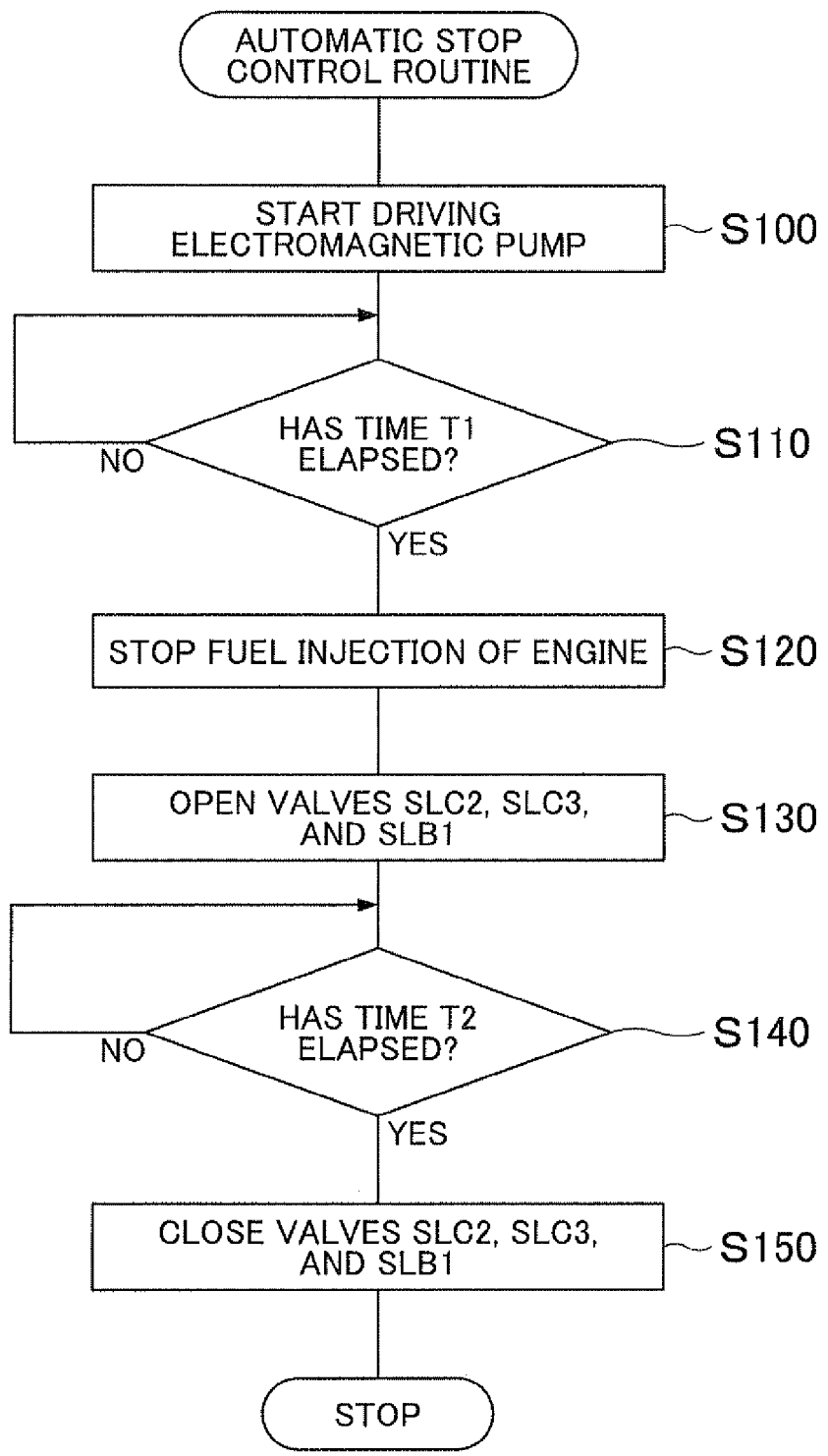
FIG. 5 is a flowchart showing an exemplary automatic stop control routine.

FIG. 5 is a flowchart showing an exemplary automatic stop control routine executed by the AT ECU 16. The routine is executed when the automatic stop conditions discussed earlier are satisfied and an automatic stop command is received from the main ECU 90.

When the automatic stop control routine is executed, the AT ECU 16 first starts driving the electromagnetic pump 60 (step S100). The process waits for a predetermined time T1, which is required for the engine 12 to be stabilized at an idling rotational speed (such as 800 rpm or 1000 rpm, for example), to elapse after the automatic stop command is received (step S110). The electromagnetic pump 60 is driven by energizing and de-energizing a coil of the solenoid 61 repeatedly at constant intervals. Next, when the predetermined time T1 elapses, fuel injection of the engine 12 is stopped (step S120). In the embodiment, fuel injection is stopped by transmitting a fuel injection stop command to the main ECU 90, which transfers the received fuel injection stop command to the engine ECU 15. Then, the linear solenoid valves SLC2, SLC3, and SLB1 are controlled so as to be opened (step S130). The process waits for a predetermined time T2, which is required for the line pressure PL (signal pressure) to fall below the set pressure for the C1 relay valve 70, to elapse (step S140). The linear solenoid valves SLC2, SLC3, and SLB1 are controlled so as to be closed (step S150). The routine is thus terminated. Here, the linear solenoid valves SLC2, SLC3, and SLB1 are opened at a supply pressure appropriately set in such a range that no input torque is transferred by each of the clutches C2 and C3 and the brake B1. Specifically, the linear solenoid valves SLC2, SLC3, and SLB1 are opened at a supply pressure (stroke end pressure) in such a range that the stroke of a piston extends from the attachment position of the piston to its stroke end and that no torque is transferred. When the linear solenoid valves SLC2, SLC3, and SLB1 are opened, the line pressure oil passage 51 is communicated with the oil chambers 58b to 58d of the clutches C2 and C3 and the brake B1 via the drive pressure oil passage 52 and the clutch oil passages 56b and 56c and the brake oil passage 56d. Thus, the line pressure PL is abruptly decreased by an increase in capacity due to communication of the line pressure oil passage 51 with the clutch oil passages 56b and 56c and the brake oil passage 56d and the oil chambers 58b to 58d. Therefore, the line pressure PL falls below the set pressure for the C1 relay valve 70, which causes the C1 relay valve 70 to immediately switch from communication between the oil chamber 58a of the clutch C1 and the output port 84a of the linear solenoid valve SLC1 to communication between the oil chamber 58a of the clutch C1 and the discharge port 62b of the electromagnetic pump 60 in order to transfer the discharge pressure from the electromagnetic pump 60 to the oil chamber 58a of the clutch C1. By forcibly abruptly decreasing the line pressure PL by opening the linear solenoid valves SLC2, SLC3, and SLB1 when stopping the engine 12, the period from the time operation of the engine 12 is stopped until supply of the discharge pressure from the electromagnetic pump 60 to the oil chamber 58a of the clutch C1 is started is shortened. In the embodiment, the discharge capacity of the electromagnetic pump 60 is determined such that the electromagnetic pump 60 discharges a hydraulic pressure necessary to keep the clutch C1 at the stroke end pressure.

When the automatic start conditions discussed earlier are satisfied with the discharge pressure from the electromagnetic pump 60 keeping the clutch C1 standing by at the stroke end pressure along with stop of the engine 12, the engine 12 is cranked to start, along with which operation of the mechanical oil pump 44 is started to raise the line pressure PL. When the line pressure PL exceeds the set pressure for the C1 relay valve 70, the C1 relay valve 70 communicates the oil chamber 58a of the clutch C1 with the output port 84a of the linear solenoid valve SLC1. Therefore, the SLC1 pressure is introduced into the oil chamber 58a of the clutch C1 in place of the discharge pressure from the electromagnetic pump 60 to completely engage the clutch C1. By supplying a hydraulic pressure from the electromagnetic pump 60 to the oil chamber 58a of the clutch C1 to keep the clutch C1 standing by at the stroke end pressure with the engine 12 automatically stopped as described above, the clutch C1 can be quickly engaged immediately after the engine 12 is automatically started, which allows the vehicle to start moving smoothly.

Figure 6:
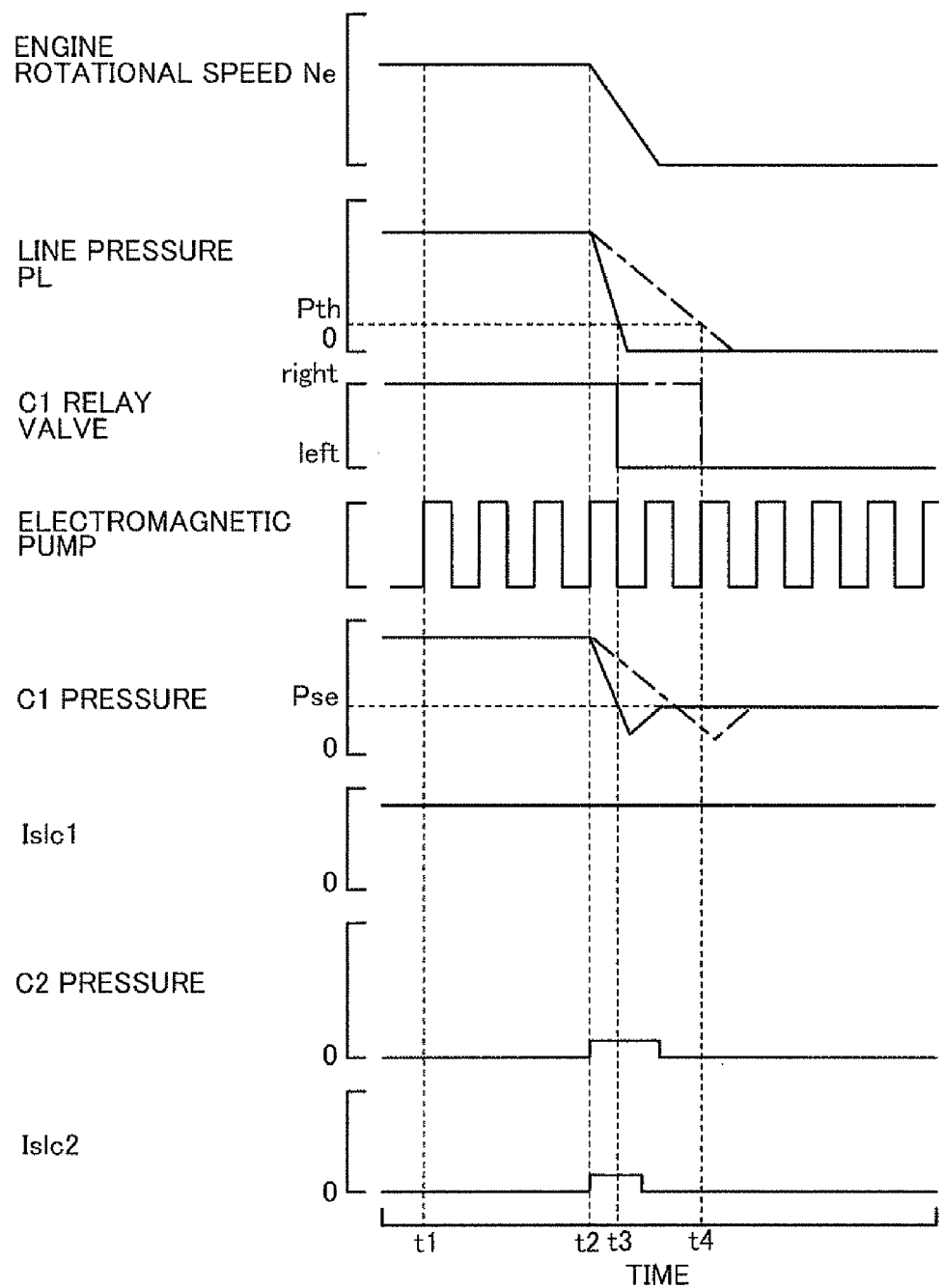
FIG. 6 illustrates variations over time in engine rotational speed Ne, line pressure PL, state of a C1 relay valve 70, state of an electromagnetic pump 60, hydraulic pressure of a clutch C1 (C1 pressure), solenoid current Islc1 of a linear solenoid valve SLC1, hydraulic pressure of a clutch C2 (C2 pressure), and solenoid current Islc2 that occur when automatically stopping an engine 12.

FIG. 6 is illustrates variations over time in engine rotational speed Ne, line pressure PL, state of the C1 relay valve 70, state of the electromagnetic pump 60, hydraulic pressure of the clutch C1 (C1 pressure), solenoid current Islc1 of the linear solenoid valve SLC1, hydraulic pressure of the clutch C2 (C2 pressure), and solenoid current Islc2 that occur in the case where the line pressure PL is forcibly reduced when automatically stopping the engine 12 (the embodiment). In FIG. 6, the dash-dotted lines indicate variations over time in line pressure PL and C1 pressure that occur in the case where the line pressure PL is not forcibly reduced when automatically stopping the engine 12 (a comparative example). The hydraulic pressures and the solenoid currents for the clutch C3 and the brake B1 are the same as the C2 pressure and the solenoid current Islc2, respectively, and thus are not shown. As shown in the drawing, when the automatic stop conditions for the engine 12 are satisfied at time t1, drive of the electromagnetic pump 60 is started, and fuel injection of the engine 12 is stopped at time t2, at which the predetermined time T1 has elapsed from time t1. At this time, the linear solenoid valves SLC2, SLC3, and SLB1 are opened to supply the line pressure PL to the clutches C2 and C3 and the brake B1 at a time, which abruptly decreases the line pressure PL. Therefore, the line pressure PL falls below the set pressure for the C1 relay valve 70 in a relatively short period (time t3) from time t2. Therefore, the C1 relay valve 70 immediately switches from communication between the oil chamber 58a of the clutch C1 and the output port 84a of the linear solenoid valve SLC1 to communication between the oil chamber 58a of the clutch C1 and the discharge port 62b of the electromagnetic pump 60. Thus, the time lag since operation of the engine 12 is stopped until supply of the discharge pressure from the electromagnetic pump 60 to the oil chamber 58a of the clutch C1 is started is extremely short, which allows the stroke end pressure to be applied to the oil chamber 58a of the clutch C1 in a short period after the engine 12 is automatically stopped. In the comparative example, on the other hand, the line pressure PL is reduced only slowly even when fuel injection of the engine 12 is stopped. Therefore, the C1 relay valve 70 maintains communication between the oil chamber 58a of the clutch C1 and the output port 84a of the linear solenoid valve SLC1 over a relatively long period. Therefore, start of supply of the discharge pressure from the electromagnetic pump 60 to the oil chamber 58a of the clutch C1 is delayed, and the oil chamber 58a of the clutch C1 is at a pressure lower than the stroke end pressure. Thus, if the engine 12 is started with the automatic start conditions satisfied during this period, it takes some time before a hydraulic pressure necessary for engagement is applied to the oil chamber 58a, which delays engagement of the clutch C1.

The fluid pressure control device for the automatic transmission 20 according to the embodiment described above includes the C1 relay valve 70 which allows communication between the output port 84a of the linear solenoid valve SLC1 and the oil chamber 58a of the clutch C1 and blocks communication between the discharge port 62b of the electromagnetic pump 60 and the oil chamber 58a of the clutch C1 when the line pressure PL which is equal to or more than the set pressure is applied to the signal pressure port 72a, and which blocks communication between the output port 84a of the linear solenoid valve SLC1 and the oil chamber 58a of the clutch C1 and allows communication between the discharge port 62b of the electromagnetic pump 60 and the oil chamber 58a of the clutch C1 when the line pressure PL which is equal to or more than the set pressure is not applied to the signal pressure port 72a. When the automatic stop conditions are satisfied with the engine 12 in operation, drive of the electromagnetic pump 60 is started, fuel injection of the engine 12 is stopped, and the linear solenoid valves SLC2, SLC3, and SLB1, which are different from the linear solenoid valve SLC1 which supplies a hydraulic pressure to the clutch C1 for starting, are opened over the predetermined time T2. This forcibly abruptly decreases the line pressure PL, which allows the C1 relay valve 70 to immediately switch from communication between the oil chamber 58a of the clutch C1 and the output port 84a of the linear solenoid valve SLC1 to communication between the oil chamber 58a of the clutch C1 and the discharge port 62b of the electromagnetic pump 60. As a result, the stroke end pressure can be applied to the oil chamber 58a of the clutch C1 in a short period after the engine 12 is automatically stopped, which allows the clutch C1 to be immediately engaged even in the case where the engine 12 is automatically started immediately after being automatically stopped.

In the embodiment, when automatically stopping the engine 12, the linear solenoid valves SLC2, SLC3, and SLB1 which respectively supply a hydraulic pressure to the clutches C2 and C3 and the brake B1, rather than the clutch C1 for starting, are opened. However, one or more of these linear solenoid valves may not be opened, or a linear solenoid valve that supplies a hydraulic pressure to the brake B2 may be opened. In the case where only one or more of the linear solenoid valves which supply a hydraulic pressure to the oil chambers of the clutches C2 and C3 and the brakes B1 and B2, rather than the clutch C1 for starting, are to be opened, it is desirable to open such linear solenoid valves that allow communication with an oil chamber that allows a large volume of a fluid to flow in the oil chamber or that allow communication with an oil chamber among the oil chambers of the clutches C2 and C3 and the brakes B1 and B2 such that the sum of an allowable volume of fluid to flow in the chamber and an allowable volume of fluid to flow in an oil passage from the line pressure oil passage 51 (drive pressure oil passage 52) to the oil chamber is large. In this case, an increase in volume along with opening of the linear solenoid valves can be increased to effectively abruptly decrease the line pressure PL. The line pressure PL may be abruptly decreased by opening another valve that allows communication between an oil passage that supplies a hydraulic pressure to the torque converter 24 and the line pressure oil passage 51, for example, rather than opening the linear solenoid valves which supply a hydraulic pressure to the clutches and the brakes.

In the embodiment, the electromagnetic pump 60 is driven to keep the clutch C1 standing by at the stroke end pressure when the engine 12 is not in operation. However, the clutch C1 may be kept standing by at a hydraulic pressure different from the stroke end pressure, for example at a hydraulic pressure slightly higher than the stroke end pressure in a range in which large torque is not transferred.

In the embodiment, the line pressure PL is used as the signal pressure to be input to the signal pressure port 72a of the C1 relay valve 70. However, the present invention is not limited thereto, and any pressure generated on the basis of the line pressure PL may be used as the signal pressure. For example, the modulator pressure PMOD may also be used as the signal pressure.

In the embodiment, a 6-speed speed change mechanism that provides first to sixth forward speeds is used as the speed change mechanism 30. However, the present invention is not limited thereto, and a speed change mechanism such as 4-speed, 5-speed, and 8-speed speed change mechanisms may also be used.

Here, the correspondence between the main elements of the embodiment and the main elements of the invention described in the "SUMMARY OF THE INVENTION" section will be described. In the embodiment, the engine 12 corresponds to the "motor". The clutches C1 to C3 and the brakes B1 and B2 correspond to the "friction engagement element". The clutch C1 corresponds to the "friction engagement element for starting". The mechanical oil pump 44 corresponds to the "first pump". The regulator valve 46 corresponds to the "pressure regulator". The electromagnetic pump 60 corresponds to the "second pump". The C1 relay valve 70 corresponds to the "switcher". The linear solenoid valves SLC2, SLC3, and SLB1 correspond to the "fluid supply unit". The AT ECU 16 which executes the automatic stop control routine of FIG. 5 corresponds to the "control section". Here, the "motor" is not limited to the engine 12 which is an internal combustion engine, and may be any type of motor such as an electric motor. The "second pump" is not limited to the electromagnetic pump 60, and may be any type of pump actuated by supply of electric power such as an electric pump actuated by power from an electric motor. The "pressure regulator" is implemented by forming the linear solenoid valves SLC1, SLC2, SLC3, and SLB1 as a direct-control linear solenoid valve that generates an optimum clutch or brake pressure from the line pressure PL to directly control the clutch or brake. However, a linear solenoid valve may be used as a pilot-control linear solenoid valve to drive a separate control valve, which generates a clutch or brake pressure to control the clutch or brake. The correspondence between the main elements of the embodiment and the main elements of the invention described in the "SUMMARY OF THE INVENTION" section does not limit the elements of the invention described in the "SUMMARY OF THE INVENTION" section, because the embodiment is an example given for the purpose of specifically describing the best mode for carrying out the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and sprit of the present invention.

The present invention may be applied to the automotive industry.

What is claimed is:

1. A fluid pressure control device for an automatic transmission that is mounted on a vehicle including a motor capable of intermittent operation and that transfers power from the motor to an axle side with a speed of the power changed via a friction engagement element actuated by a fluid pressure, comprising:
    a first pump actuated by the power from the motor;
    a pressure regulator that regulates a discharge pressure from the first pump;
    a second pump actuated by supply of electric power;
    a switcher actuated by a signal pressure generated on the basis of a fluid pressure regulated by the pressure regulator, the switcher opening a first path, which extends from the pressure regulator to a fluid pressure chamber of a friction engagement element for starting, and blocking a second path, which extends from the second pump to the fluid pressure chamber of the friction engagement element for starting, when the signal pressure is equal to or more than a set pressure, and the switcher blocking the first path and opening the second path when the signal pressure is less than the set pressure;
    a fluid supply unit that supplies the fluid pressure regulated by the pressure regulator to a destination different from the fluid pressure chamber of the friction engagement element for starting; and
    a control section that controls the second pump so as to be actuated and controls the fluid supply unit so as to supply the fluid pressure regulated by the pressure regulator to the destination when the motor which has been in operation is stopped.

2. The fluid pressure control device for an automatic transmission according to claim 1, which is capable of switching an engagement state of a plurality of friction engagement elements to perform speed shift, wherein
    the fluid supply unit is a supply unit that supplies the fluid pressure to a fluid pressure chamber of a friction engagement element, of the plurality of friction engagement elements, that is different from the friction engagement element for starting as the destination.

3. The fluid pressure control device for an automatic transmission according to claim 2, wherein
    the fluid supply unit is a supply unit that supplies the fluid pressure to a fluid pressure chamber of a friction engagement element, of the plurality of friction engagement elements as the destination, that allows, together with an oil passage up to the fluid pressure chamber, a large volume of a fluid to flow.

4. The fluid pressure control device for an automatic transmission according to any claim 1, wherein
    the second pump is an electromagnetic pump that discharges a fluid pressure by reciprocating a piston by turning on and off an electromagnetic force.

* * * * *